(12) United States Patent
Monyak

(10) Patent No.: US 6,454,360 B1
(45) Date of Patent: Sep. 24, 2002

(54) GROUND-WORKING TOOLS FOR USE IN POWER RAKES

(75) Inventor: Kenneth Monyak, Abingdon, VA (US)

(73) Assignee: Sandvik Rock Tools, Inc., Bristol, VA (US)

( * ) Notice: Subject to any disclaimer, the term of this patent is extended or adjusted under 35 U.S.C. 154(b) by 0 days.

(21) Appl. No.: 09/684,784

(22) Filed: Oct. 10, 2000

(51) Int. Cl.⁷ .................. E21C 25/08; E21C 35/197
(52) U.S. Cl. .................. 299/39.4; 299/104; 172/772
(58) Field of Search .................. 299/194, 105, 299/106, 110, 39.4, 39.1, 52, 51, 41.1; 172/772, 719

(56) References Cited

U.S. PATENT DOCUMENTS

| | | | |
|---|---|---|---|
| 3,148,917 A | * | 9/1964 | Thompson |
| 3,801,158 A | * | 4/1974 | Radd et al. |
| 4,489,986 A | * | 12/1984 | Dziak |
| 4,684,176 A | | 8/1987 | Den Besten et al. |
| 4,968,101 A | * | 11/1990 | Bossow |
| 5,645,323 A | | 7/1997 | Beach |
| 6,000,153 A | * | 12/1999 | Sollami |
| 6,076,895 A | * | 6/2000 | Ino et al. |
| 6,244,665 B1 | * | 6/2001 | Bise et al. |

* cited by examiner

Primary Examiner—David Bagnell
Assistant Examiner—Daniel P Stephenson
(74) Attorney, Agent, or Firm—Burns, Doane, Swecker & Mathis, LLP

(57) ABSTRACT

A power rake attachment includes a rotary drum and a plurality of bit assemblies mounted on an outer surface of the drum. Each bit assembly includes a hollow holder affixed to the outer surface, and a cutter bit disposed in the holder. The cutter bit includes a front cutting head and a rear shank. The shank extends into the holder, and the cutting head projects longitudinally past a front end of the holder. A retainer retains the shank within the holder, and wear sleeve is disposed around an outer surface of the holder. The cutter bit includes a laterally outwardly projecting sleeve-retaining portion which extends laterally past the outer surface of the holder and into overlying relationship to a front end of the holder to retain the wear sleeve longitudinally on the holder.

11 Claims, 2 Drawing Sheets

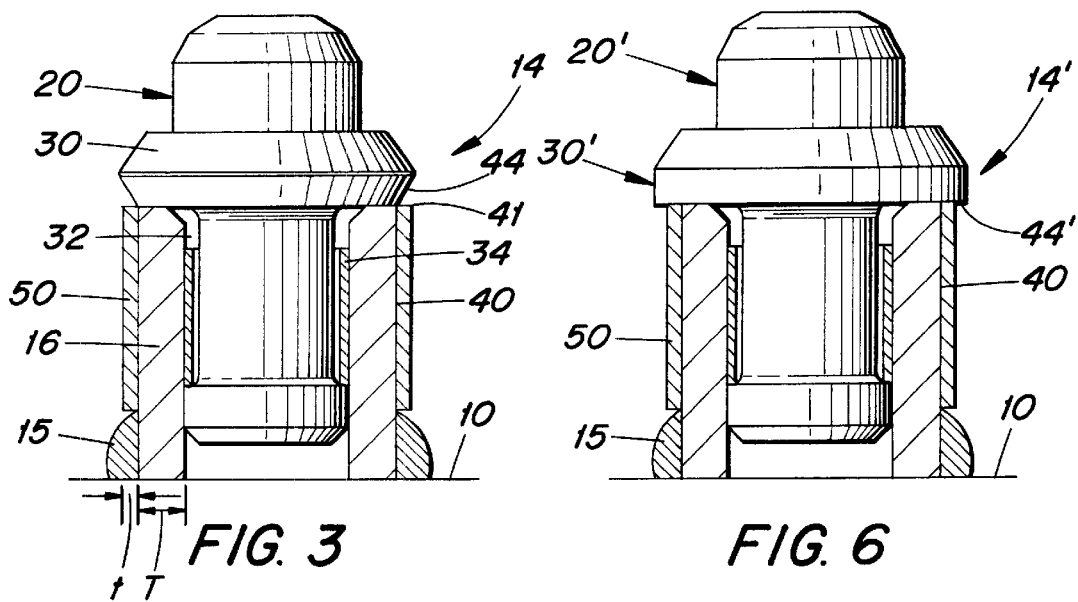
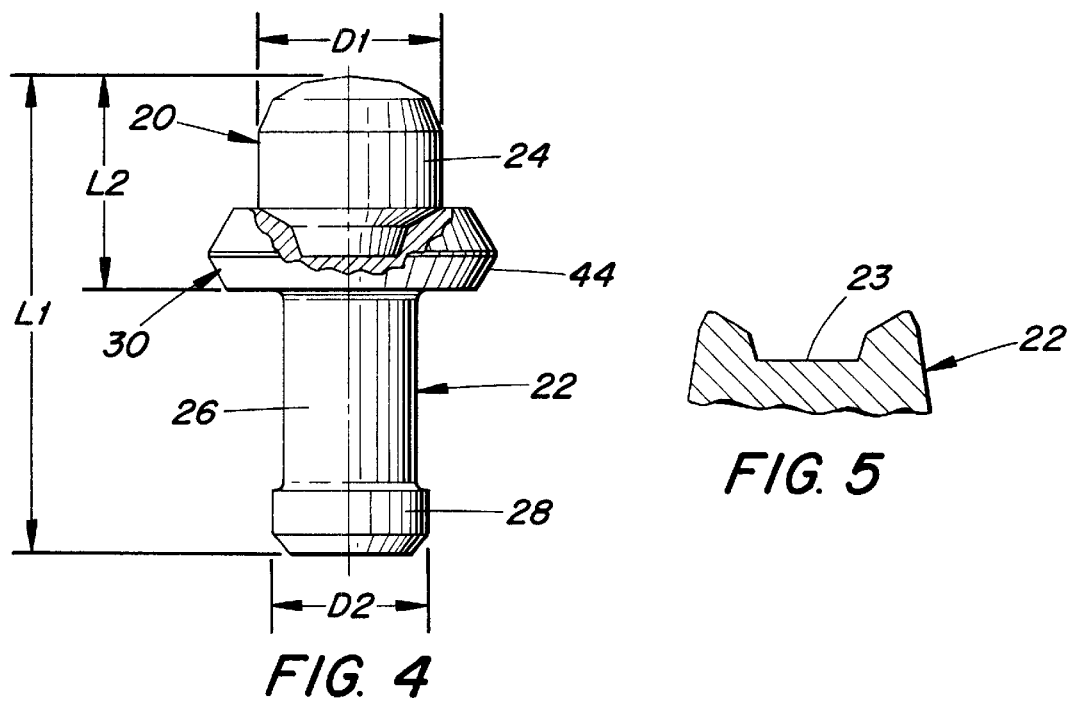

GROUND-WORKING TOOLS FOR USE IN POWER RAKES

BACKGROUND OF THE INVENTION

The present invention relates to ground-working tools, such as the type used in power rakes.

Power rakes are conventional ground-working implements which employ a driven drum mounted for rotation about a horizontal axis. The drum carries tools that project outwardly from an outer surface of the drum to cut into the soil to a relatively shallow depth, e.g., no more than a few inches. When provided with tools in the form of tines and applied to established lawns, the power rake performs a dethatching function.

It has also been learned that if tools in the form of rigid bits are mounted on the drum (in lieu of tines), and the power rake is used on compacted bare soil, the bits perform a shallow tilling function to prepare the soil for seeding. Therefore, it has become common to provide a bit-carrying power rake attachment that can be mounted on utility vehicles commonly employed at construction sites, such as front end loaders. Such power rakes can be used following construction of a building to cut open the upper layer of the surrounding soil that has been severely compacted by the passage of utility vehicles so that the soil can be seeded. Such a connection to a front end loader 1 is depicted in FIG. 1. The power rake attachment 2 is connected to the lifting arms 3 of the loader 1 and includes a drum 4 mounted to be driven about a horizontal axis in either direction of rotation, i.e., so the rotation direction of the drum can be changed when the direction of the vehicle is changed. A plurality of radial bits 5 is fixed to the outer surface of the drum to cut the upper soil layer as the drum is rotated while traversing the ground.

The bits 5 are typically welded to the drum surface, which makes it difficult to replace the bits as they become worn. It would, therefore, be desirable to provide a tool, preferably adapted for power rakes, which is relatively easily replaceable.

SUMMARY OF THE INVENTION

The present invention relates to a power rake attachment which includes a rotary drum defining a longitudinal center axis, and a plurality of bit assemblies mounted on an outer surface of the drum. Each bit assembly comprises a hollow holder affixed to the outer surface, and a cutter bit including a front cutting head and a rear shank. The shank extends into the holder, and the cutting head projects longitudinally past a front end of the holder. A retainer retains the shank within the holder, and a wear sleeve is disposed around an outer surface of the holder. The cutter bit includes a sleeve-retaining portion projecting laterally outwardly with respect to a longitudinal axis of the bit. The sleeve-retaining portion extends laterally past the outer surface of the holder and into overlying relationship to a front end of the wear sleeve to retain the wear sleeve longitudinally on the holder.

BRIEF DESCRIPTION OF THE DRAWINGS

The objects and advantages of the invention will become apparent from the following detailed description of preferred embodiments thereof in connection with the accompanying drawings in which like numerals designate like elements and in which:

FIG. 3 is a longitudinal sectional view taken through a bit assembly according to a first embodiment of the present invention;

FIG. 4 is a side elevational view of a bit shown in FIG. 3, with a portion thereof broken away;

FIG. 5 is a fragmentary sectional view of a front portion of a shank of the bit; and FIG. 6 is a view similar to FIG. 3 of an alternative embodiment of the invention.

DETAILED DESCRIPTION OF PREFERRED EMBODIMENTS OF THE INVENTION

Figure 1:
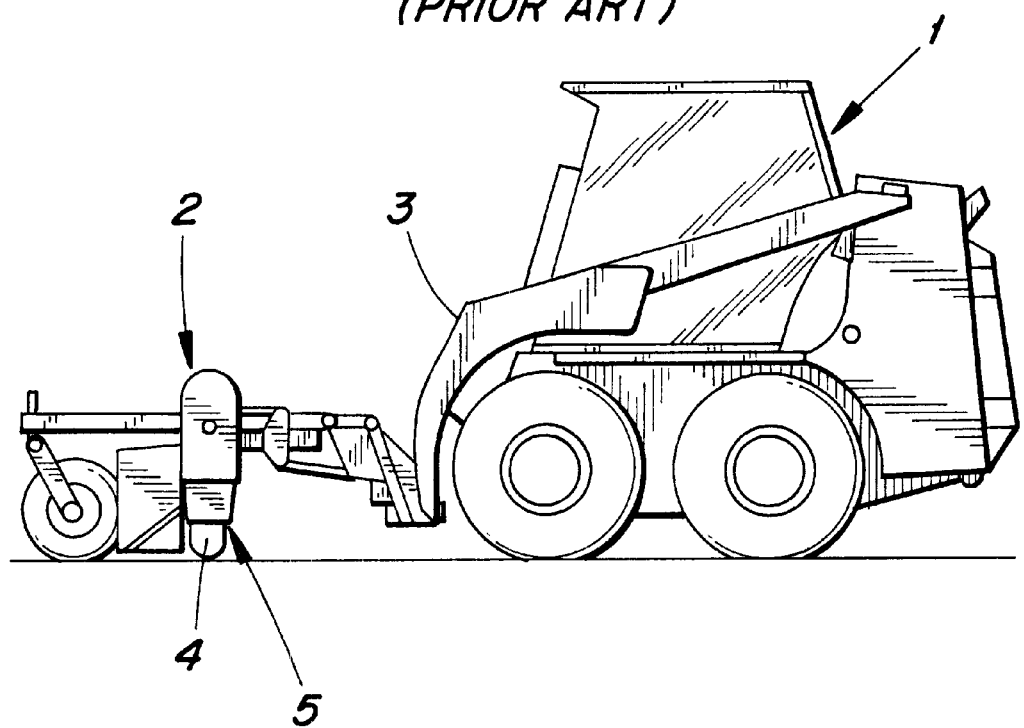
FIG. 1 is a side elevational view of a prior art power rake attachment mounted on a vehicle.
Figure 2:
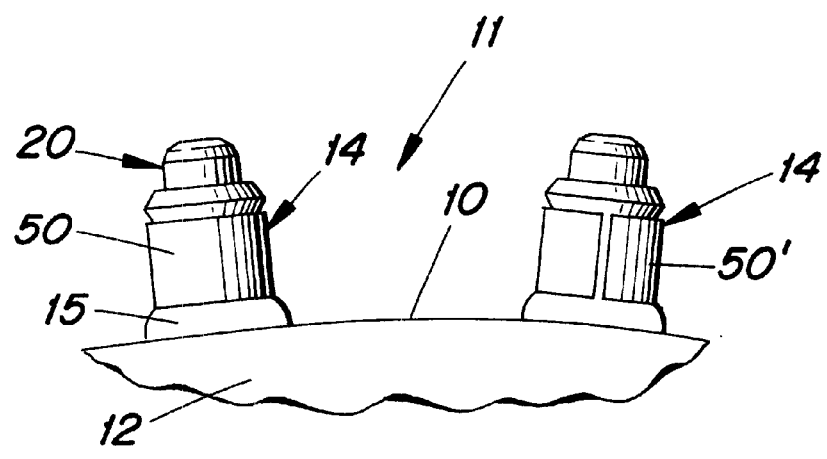
FIG. 2 is a fragmentary portion of a power rake attachment according to the present invention.

Depicted in FIG. 2 is a portion of an outer periphery 10 of a power rake attachment 11 which includes driven rotary drum 12 and bit assemblies 14 mounted thereon. The power rake attachment 11 is adapted to be mounted on a carrier such as the vehicle 1 shown in FIG. 1. Each bit assembly 14 comprises a holder in the form of a hollow cylindrical tube 16 having a rear end welded to the outer periphery of the drum by a weld bead 15 (see FIG. 3). The tube 16 is typically formed of steel.

Mounted in the tube 16 is a freely rotatable cutting bit 20. The cutting bit includes a shank 22 and a cutting head or tip 24 welded in a pocket 23 of the shank (see FIGS. 4 and 5) and extending longitudinally forwardly past the tube 16. The shank 22 is preferably formed of steel, and the tip 24 preferably of a harder material, such as cemented carbide.

The shank 22 includes an intermediate portion 26 at respective ends of which are disposed a rear collar 28 and a front collar 30. The rear collar 28 is of slightly larger diameter than the intermediate portion 26 and substantially corresponds to an inner diameter of the tube 16.

The outer peripheral surface of the intermediate portion, together with the front and rear collars 30, 28, form a gap 32 between the inner surface of the tube and an outer surface of the intermediate portion.

The cutting bit 22 preferably has an overall length L1 in the range of 1.25 to 2.0 inches, more preferably about 1.5 inches. The distance L2 from the tip of the bit to the rear end of the collar is preferably in the range of 0.5 to 1.0 inches, more preferably about 0.7 inches. An outer diameter D1 of the tip 24 is preferably in the range 0.4 to 1.0 inches, more preferably about 0.6 inches. The outer diameter D2 of the rear collar 28 is preferably in the range 0.3 to 0.8 inches, more preferably about 0.5 inches.

In order to secure the shank within the tube 16, a conventional resilient keeper 34 is provided. The keeper 34 comprises a longitudinally split ring that can be positioned around the intermediate portion 26. The ring, while having a relaxed-state diameter that is greater than an inner diameter of the tube 16, is compressible to enable the shank to be inserted into the tube. Then, the ring expands to frictionally grip the inside surface 36 of the tube. The ring 34 opposes movement of the bit 20 out of the tube 16 by abutting against the rear collar 28, while permitting the bit to rotate about its own longitudinal axis. Keepers of that nature are well known, e.g., see U.S. Pat. No. 4,684,176. By enabling the bit to rotate, wear thereof will be distributed so that the bit is, in effect, self-sharpening.

Extending around an outer surface 40 of the tube 16 is a wear sleeve 50. The wear sleeve is a cylindrical member that can be removed from the tube 16 and replaced by a fresh wear sleeve.

In a first embodiment, the wear sleeve 50 is freely rotatable relative to the tube 16 so as to be wear resistant. That is, during a cutting operation, when the wear sleeve contacts the ground, it rotates, thereby dissipating the resulting energy rather than resisting it. Consequently, the amount of wear that occurs is reduced. The rotatable wear sleeve 50 could be shaped so as to be continuous around its circumference, and having an inner diameter slightly larger than an outer diameter of the tube 16. Alternatively, the rotatable wear sleeve 50 could comprise a longitudinally split sleeve having a larger diameter than the tube 16.

The sleeve 50 is preferably formed of hardened spring steel so as to be highly wear resistant.

In a second preferred embodiment, the wear sleeve 50' (FIG. 2) is non-rotatable such as by having an inner diameter that is smaller than the outer diameter of the tube 16 when the sleeve is unstressed, i.e., not mounted. Thus, when mounted, the sleeve has a compression fit with the tube. Preferably, that is achieved by shaping the sleeve 50' as a longitudinally split sleeve (see FIG. 2) having a relaxed inner diameter that is smaller than the diameter of the surface 40.

Regardless of which embodiment of wear sleeve 50 or 50' is employed, it is retained on the tube by the front collar 30. The front collar can be of any suitable configuration, as long as it retains the wear sleeve on the tube. In one preferred configuration, the front collar has a rear surface 44, that is flared so as to be inclined forwardly away from the front end 41 of the wear sleeve. Surface 44 contacts an inner edge of a front surface of the wear sleeve and extends radially outwardly past the tube, so that the wear sleeve is blocked from traveling forwardly off the tube 16.

Furthermore, the surface 44 is accessible to be contacted by a pulling tool (not shown) whereby the bit can be pulled out of the tube, if necessary, for replacement.

The wear sleeve 50 or 50' has a radial thickness t that is not greater than one-half a thickness T of the tube 16 as is evident form each of FIGS. 3 and 6.

In an alternative arrangement, shown in FIG. 6, the surface 44' of the front collar lies in a plane oriented perpendicular to the axis, and extends radially outwardly past not only the tube 16, but also the wear sleeve, so that an outer peripheral portion of the surface 44' is accessible to a pulling tool.

In practice, the wear sleeve 50 or 50' is installed around the outer surface of the tube before the cutting bit 20 is installed. Once installed, the cutting bit 20 is held within the tube 16 by the keeper 34, while being able to rotate relative to the tube about the common longitudinal axis of the tube and the bit. The wear sleeve 50 or 50' cannot be dislodged from the tube, because it is retained thereon between the weld bead 15 and the laterally outwardly projecting front collar 30 of the cutting bit.

It will be appreciable, therefore, that the present invention provides a relatively easily replaceable tool that is resistant to wear.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A soil-working apparatus comprising:
    a rotary drum defining a longitudinal center axis; and
    a plurality of bit assemblies mounted on an outer surface of the drum, each bit assembly comprising:
        a hollow holder affixed to the outer surface, the holder comprising a tube defining a center axis of the holder and having a substantially cylindrical outer surface,
        a cutter bit including a front cutting head and a rear shank, the shank extending into the tube, the cutting head projecting longitudinally past a front end of the tube,
        a retainer retaining the shank within the tube; and
        a wear sleeve disposed around the outer surface of the tube and having an inner diameter larger than a diameter of the outer surface of the tube to be rotatable relative thereto about the center axis of the tube, the wear sleeve having a thickness measured in a radial direction thereof which is no greater than one-half of a thickness of the tube measured in the same direction;
        the cutter bit including a laterally outwardly projecting sleeve-retaining portion projecting laterally outwardly with respect to a longitudinal axis of the bit, the sleeve-retaining portion extending laterally past the outer surface of the tube and into overlying relationship to a front end of the wear sleeve to retain the wear sleeve longitudinally on the holder.

2. A soil-working apparatus according to claim 1, wherein the cutter bit is freely rotatable relative to the tube about a longitudinal axis of the cutter bit.

3. The soil-working apparatus according to claim 2, wherein the shank includes an intermediate portion disposed in the tube and front and rear collars disposed at front and rear portions, respectively, of the intermediate portion, the retainer disposed around the intermediate portion between the front and rear collars.

4. The soil-working apparatus according to claim 3, wherein the keeper comprises a split ring frictionally engaging an inner periphery of the tube.

5. The soil-working apparatus according to claim 2 wherein the wear sleeve comprises a split sleeve.

6. The soil-working apparatus according to claim 1, wherein the sleeve-retaining portion includes a retaining surface facing the front end of the wear sleeve, at least a portion of the retaining surface being accessible to being pulled by a pulling tool.

7. The soil-working apparatus according to claim 6, wherein the retaining surface is inclined forwardly away from the front end of the wear sleeve.

8. The soil-working apparatus according to claim 6, wherein the retaining surface extends laterally outwardly past the wear sleeve.

9. The soil-working apparatus according to claim 1 wherein the cutter bit has a length in the range of 1.25 to 2.0 inches, and the cutting head has a diameter in the range of 0.4 to 1.0 inches.

10. The soil-working apparatus according to claim 1 wherein the wear sleeve is continuous around its circumference.

11. The soil-working apparatus according to claim 1 wherein the wear sleeve comprises a split sleeve.

* * * * *